(12) United States Patent
Schmidt et al.

(10) Patent No.: US 6,842,803 B2
(45) Date of Patent: Jan. 11, 2005

(54) COMPUTER SYSTEM WITH PRIVILEGED-MODE MODEM DRIVER

(75) Inventors: Rodney Schmidt, Austin, TX (US); Geoffrey S. Strongin, Austin, TX (US); David W. Smith, Cedar Park, TX (US); Brian C. Barnes, Round Rock, TX (US); Terry L. Cole, Austin, TX (US); Michael Barclay, Swallowcliffe (GB)

(73) Assignee: Advanced Micro Devices, Inc., Austin, TX (US)

( * ) Notice: Subject to any disclaimer, the term of this patent is extended or adjusted under 35 U.S.C. 154(b) by 415 days.

(21) Appl. No.: 09/901,503

(22) Filed: Jul. 9, 2001

(65) Prior Publication Data

US 2003/0031148 A1 Feb. 13, 2003

(51) Int. Cl.[7] .............................................. G06F 13/12
(52) U.S. Cl. ............................. 710/69; 710/5; 710/29; 710/33; 709/200; 709/233; 711/200; 341/126
(58) Field of Search ................................ 710/5, 29, 33, 710/69, 7, 20, 35, 36, 65, 107, 200, 244; 711/200; 709/200, 233; 341/126; 712/405

(56) References Cited

U.S. PATENT DOCUMENTS

| | | | |
|---|---|---|---|
| 3,828,327 A | | 8/1974 | Berglund et al. ......... 340/172.5 |
| 5,247,639 A | * | 9/1993 | Yamahata ................... 711/138 |
| 5,347,636 A | * | 9/1994 | Ooi et al. ................... 711/203 |
| 5,371,879 A | * | 12/1994 | Schiffleger ................... 703/26 |
| 5,784,615 A | * | 7/1998 | Lipe et al. ................... 719/324 |
| 5,812,639 A | * | 9/1998 | Bartholomew et al. ..... 370/352 |
| 5,925,114 A | | 7/1999 | Hoang .......................... 710/48 |
| 5,948,097 A | * | 9/1999 | Glew et al. ................... 712/220 |
| 6,014,705 A | * | 1/2000 | Koenck et al. ............. 709/230 |
| 6,154,818 A | | 11/2000 | Christie ....................... 711/163 |
| 6,360,281 B1 | * | 3/2002 | Feagans .......................... 710/1 |
| 6,504,838 B1 | * | 1/2003 | Kwan .......................... 370/352 |
| 6,529,969 B1 | * | 3/2003 | Inoue ........................... 710/33 |
| 6,718,485 B1 | * | 4/2004 | Reiser ........................... 714/38 |
| 2002/0052968 A1 | * | 5/2002 | Bonefas et al. ............. 709/231 |
| 2002/0124108 A1 | * | 9/2002 | Terrell et al. ............... 709/245 |
| 2002/0129272 A1 | * | 9/2002 | Terrell et al. ............... 713/201 |

FOREIGN PATENT DOCUMENTS

| | | | |
|---|---|---|---|
| JP | 01147723 A | * 6/1989 | ............. G06F/9/38 |
| WO | WO 00/22865 | 4/2000 | |
| WO | WO 00/70427 | 11/2000 | |

OTHER PUBLICATIONS

International Search Report dated Oct. 28, 2002 (PCT/US02/18859; TT4055-PCT).

* cited by examiner

*Primary Examiner*—Kim Huynh
*Assistant Examiner*—Angel L. Casiano
(74) *Attorney, Agent, or Firm*—Williams, Morgan & Amerson

(57) ABSTRACT

A communications system includes physical layer hardware and a processing unit. The physical layer hardware is adapted to communicate data over a communications channel in accordance with a plurality of control codes. The physical layer hardware is adapted to demodulate an incoming analog signal to generate a digital receive signal and modulate a digital transmit signal to generate an analog transmit signal. The processing unit is adapted to execute a privileged driver for interfacing with the physical layer hardware. The privileged driver includes program instructions for implementing a protocol layer to decode the digital receive signal, encode the digital transmit signal, and configure the physical layer hardware for receipt of the digital receive signal and transmission of the digital transmit signal based on the plurality of control codes. A method for configuring a transceiver includes demodulating an incoming analog signal to generate a digital receive signal based on a plurality of control codes; modulating a digital transmit signal to generate an analog transmit signal based on the control codes; and executing a privileged driver for configuring the plurality of control codes.

22 Claims, 5 Drawing Sheets

| PRIVILEGED INSTRUCTIONS | ACCESS |
|---|---|
| access to CR3 register | operating system access only |
| access to global descriptor table | operating system and device drivers access only |
| access to interrupt descriptor table register | global access |
| access to task register | operating system and device drivers access only |
| access to PHY hardware | privileged modem driver access only |
| ... | ... |

Figure 4

COMPUTER SYSTEM WITH PRIVILEGED-MODE MODEM DRIVER

BACKGROUND OF THE INVENTION

1. Field of the Invention

This invention relates generally to modem communication and, more particularly, to a computer system with a privileged-mode modem driver.

2. Description of the Related Art

In recent years cellular telephones have become increasingly popular. A cellular telephone is one example of what is referred to as a "mobile station" or "mobile terminal." A mobile station can take on various forms other than a cellular telephone, including a computer (e.g., a notebook computer) with mobile communication capabilities.

Telecommunications services are provided between a cellular telecommunications network and a mobile station over an air interface, e.g., over radio frequencies. Typically, each subscriber having a mobile station is assigned a unique International Mobile Subscriber Identity (IMSI). At any moment, an active mobile station may be in communication over the air interface with one or more base stations. The base stations are, in turn, managed by base station controllers, also known as radio network controllers. A base station controller together with its base stations comprise a base station system. The base station controllers of a base station system are connected via control nodes to a core telecommunications network, such as the publicly switched telephone network (PSTN). One type of standardized mobile telecommunications scheme is the Global System for Mobile communications (GSM). GSM includes standards that specify functions and interfaces for various types of services. GSM systems may be used for transmitting both voice and data signals.

A particular base station may be shared among multiple mobile stations. Because the radio spectrum is a limited resource, the bandwidth is divided using combination of Time-Division and Frequency-Division Multiple Access (TDMA/FDMA). FDMA involves dividing the maximum frequency bandwidth (e.g., 25 MHz) into 124 carrier frequencies spaced 200 kHz apart. A particular base station may be assigned one or more carrier frequencies. Each carrier frequency is, in turn, divided into time slots. During an active session between the base station and the mobile station, the base station assigns the mobile unit a frequency, a power level, and a time slot for upstream transmissions from the mobile station to the base station. The base station also communicates a particular frequency and time slot for downstream transmissions from the base station destined for the mobile station.

The fundamental unit of time defined in GSM is referred to as a burst period, which lasts 15/26 ms (or approx. 0.577 ms). Eight burst periods are grouped into a TDMA frame (120/26 ms, or approx. 4.615 ms), which is the basic unit for the definition of logical channels. One physical channel is defined as one burst period per frame. Individual channels are defined by the number and position of their corresponding burst periods.

GSM frames, each frame having 8 burst periods, are grouped into superframes (e.g., groups of 51 frames) that include both traffic (i.e., voice or data signals) and control information. The control information is conveyed over common channels defined in the superframe structure. Common channels can be accessed both by idle mode and dedicated mode mobile stations. The common channels are used by idle mode mobile stations to exchange signaling information for changing to dedicated mode in response to incoming or outgoing calls. Mobile stations already in the dedicated mode monitor the surrounding base stations for handover and other information.

The common channels include:

a Broadcast Control Channel (BCCH) used to continually broadcasts information including the base station identity, frequency allocations, and frequency-hopping sequences;

a Frequency Correction Channel (FCCH) and Synchronization Channel (SCH) used to synchronize the mobile station to the time slot structure of a cell by defining the boundaries of burst periods, and the time slot numbering (i.e., every cell in a GSM network broadcasts exactly one FCCH and one SCH, which are, by definition, sent on time slot number 0 within a TDMA frame);

a Random Access Channel (RACH) used by the mobile station to request access to the network;

a Paging Channel (PCH) used to alert the mobile station of an incoming call; and an Access Grant Channel (AGCH) used to allocate a Stand-alone Dedicated Control Channel (SDCCH) to a mobile station for signaling (i.e., to obtain a dedicated channel) following a request on the RACH.

For security reasons, GSM data is transmitted in an encrypted form. Because a wireless medium can be accessed by anyone, authentication is a significant element of a mobile network. Authentication involves both the mobile station and the base station. A Subscriber Identification Module (SIM) card is installed in each mobile station. Each subscriber is assigned a secret key. One copy of the secret key is stored in the SIM card, and another copy is stored in a protected database on the communications network that may be accessed by the base station. During an authentication event, the base station generates a random number that it sends to the mobile station. The mobile station uses a random number, in conjunction with the secret key and a ciphering algorithm (e.g., A3), to generate a signed response that is sent back to the base station. If the signed response sent by the mobile station matches the one calculated by network, the subscriber is authenticated. The base station encrypts data transmitted to the mobile station using the secret key. Similarly, the mobile station encrypts data it transmits to the base station using the secret key. After a transmission received by the mobile station is decrypted, various control information, including the assigned power level, frequency, and time slot for a particular mobile station may be determined by the mobile station.

Generally, communication systems are described in terms of layers. The first layer, responsible for the actual transmission of a data carrying signal across the transmission medium, is referred to as the physical layer (PHY). The physical layer groups digital data and generates a modulated waveform based on the data in accordance with the particular transmission scheme. In GSM, the physical layer generates the transmission waveform and transmits during the assigned transmit time slot of the mobile station. Similarly, the receiving portion of the physical layer identifies data destined for the mobile station during the assigned receipt time slot.

The second layer, referred to as a protocol layer, processes digital data received by the physical layer to identify information contained therein. For example, in a GSM system, decryption of the data is a protocol layer function. Notice that changes in the operating parameters of the physical layer are identified only after decryption and processing by the protocol layer. Although this particular interdependency does not generally cause a problem in a purely hardware implementation, it may cause a problem when all or portions of the protocol layer are implemented in software.

Certain computer systems, especially portable notebook computers, may be equipped with wireless modems. One trend in modem technology involves the use of software modems that implement some of the real-time functions of traditional hardware modems using software routines. Because the hardware complexity of a software modem is less than a hardware counterpart, it is generally less expensive as well as more flexible. For example, the protocol layer decryption and processing may be implemented partially or entirely with software.

Software systems, such as PC systems, run interface control software in operating systems environments as software drivers. These drivers are responsible for communicating with the hardware devices and operate at a privileged level in the operating system. Other software applications are precluded from affecting the drivers. However, because drivers are not protected from other drivers, a variety of problems can occur that might affect the operation of a driver, such as by corrupting its operation. These effects may be caused accidentally, or may be caused by purposeful hacking. A corrupted (or co-opted) driver might cause additional problems outside the computer, such as causing a phone line or wireless channel to be used, operating an external peripheral, or deleting important data.

Because the operating parameters of the physical layer, which control the operation of the transmitter of the mobile station, are controlled by the protocol layer using software, it may be possible for a computer program or virus to take control of the mobile station and cause it to accidentally or purposefully transmit outside of its assigned time slot. A wireless communications network, such as a cellular network, relies on a shared infrastructure. A mobile station must adhere to the 'rules of the road' or it may cause interference on the network.

If certain functions of the mobile station are controlled in software, a programmer may determine how the GSM control frames are decoded and how the transmitter module is triggered. A virus may then be written and spread over the network to infiltrate the software-based mobile stations. Then, on a particular time and date, the virus could take direct control of the mobile station and transmit continuously or intermittently and inundate the base stations and other mobile units with random frequencies and full power. Such a virus design could enable and disable at random times to avoid detection, robbing the air-time supplier of some or all of his available bandwidth and may even cause a complete shutdown of the network. Such an attack may take only a few affected devices (i.e., as few as one) per cell to disable the cell completely.

The security problems associated with mobile stations operating in a shared infrastructure may be segregated into three levels of severity: tamper-proof, non-tamperproof, and class break. First, a hardware/firmware implementation (such as a cell-phone) is the hardest with which to tamper, because each device must be acquired individually and modified (i.e., tamper-proof). On the other hand, a software-based solution is easier to tamper with, as a hacker can concentrate on a software-only debugger environment (i.e., non-tamper-proof). Finally, a system with the ability to be tampered with that is similar on all systems and allows the tampering to be distributed to a large number of systems of the same type is susceptible to a 'class-break.'

A software wireless modem is susceptible not only to a class-break, but also it is among those devices whose code may be accessed from the same layer as IP (internet protocol) or another portable code access mechanism. Many software wireless modems may be integrated into computers coupled to networks or the Internet. Such an arrangement increases the susceptibility of the software to being tampered with and controlled.

Communication devices implementing other communications protocols using software may also be susceptible to some of the problems identified above, but to differing degrees and levels of consequence. For example, software drivers for communication devices using copper subscriber lines, such voice band modems (V.90), asymmetric digital subscriber line (DSL) modems, home phone line networks (HomePNA), etc., may be attacked, resulting in the subscriber line being disabled or improperly used. For example, a group of infected software modems may be used in a denial of service attack to continuously place calls to a predetermined number and overwhelm the destination. The software modem could also be used to prevent outgoing or incoming calls on the subscriber line or disrupt HomePNA traffic. Other wireless communication devices implemented in software, such as wireless network devices, could also be commandeered to disrupt traffic on the wireless network.

The present invention is directed to overcoming, or at least reducing the effects of, one or more of the problems set forth above.

SUMMARY OF THE INVENTION

One aspect of the present invention is seen in a communications system including physical layer hardware and a processing unit. The physical layer hardware is adapted to communicate data over a communications channel in accordance with a plurality of control codes. The physical layer hardware is adapted to demodulate an incoming analog signal to generate a digital receive signal and modulate a digital transmit signal to generate an analog transmit signal. The processing unit is adapted to execute a privileged driver for interfacing with the physical layer hardware. The privileged driver includes program instructions for implementing a protocol layer to decode the digital receive signal, encode the digital transmit signal, and configure the physical layer hardware for receipt of the digital receive signal and transmission of the digital transmit signal based on the plurality of control codes.

Another aspect of the present invention is seen in a method for configuring a transceiver. The method includes demodulating an incoming analog signal to generate a digital receive signal based on a plurality of control codes; modulating a digital transmit signal to generate an analog transmit signal based on the control codes; and executing a privileged driver for configuring the plurality of control codes.

BRIEF DESCRIPTION OF THE DRAWINGS

The invention may be understood by reference to the following description taken in conjunction with the accompanying drawings, in which like reference numerals identify like elements, and in which:

FIG. 4 depicts a list of exemplary instructions that may be privileged in the computer system of FIG. 1.

Figure 1:
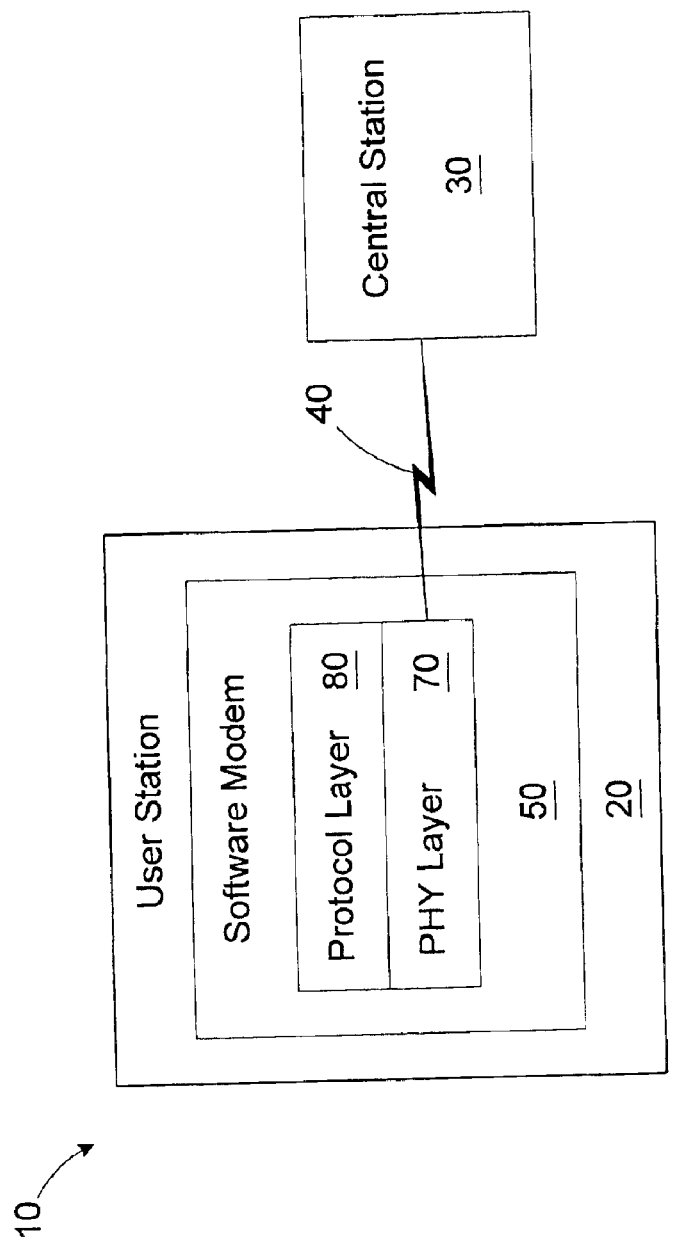
FIG. 1 is a simplified block diagram of a communications system including a user station having an authentication agent in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a block diagram of a communications system 10 is provided. The communications system 10 includes a user station 20 in communication with a central station 30 over a communication channel 40. In the illustrated embodiment, the user station 20 is a mobile computing device using a software modem 50 to communicate in accordance with a wireless communication protocol, such as GSM. The central station 30 may be a shared base station capable of serving a plurality of subscribers. Although the invention is described as it may be implemented in a wireless environment, its application is not so limited. The teachings herein may be applied to other communication environments using software implemented communication protocols (e.g., V.90, ADSL, HomePNA, Wireless LAN, etc.).

The user station 20 may comprise a variety of computing devices, such as a desktop computer, a notebook computer, a personal data assistant (PDA), etc. For purposes of illustration, the user station 20 is described as it may be implemented using a notebook computer. The software modem 50 may be installed as an internal resource. As will be appreciated by those of ordinary skill in the art, the software modem 50 includes a physical layer (PHY) 70 implemented in hardware and a protocol layer 80 implemented in software. For purposes of illustration, the functions of the software modem 50 are described as they might be implemented for a GSM communication protocol, although other protocols may be used.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The PHY layer 70 converts digital transmit signals into an analog transmit waveform and converts an incoming analog received waveform into digital received signals. For transmit signals, the output of the protocol layer 80 is the transmit "on-air" information modulated about a zero Hz carrier (i.e., a carrierless signal). The PHY layer 70 mixes (i.e., mixing may also be referred to as upconverting) the carrierless transmit signal generated by the protocol layer 80 in accordance with assigned time slot, frequency, and power level assignments communicated to the user station 20 by the central station 30 to generate the actual analog waveform transmitted by the PHY layer 70.

The central station 30 also communicates time slot and frequency assignments to the user station 20 for incoming data. The incoming analog receive waveform is sampled and downconverted based on the assigned time slot and frequency parameters to recreate a carrierless (i.e., modulated about zero Hz) receive waveform. The protocol layer 80 receives the carrierless receive waveform from the PHY layer 70 and performs baseband processing, decryption, and decoding to regenerate the received data.

Collectively, the time slot, frequency, and power level (i.e., for transmit data only) assignments are referred to as control codes. The particular algorithms used for implementing the software modem 50 are described by the particular industry standards (e.g., GSM standards) and are well known to those of ordinary skill in the art, so for clarity and ease of illustration they are not detailed herein, except as they are modified in accordance with the present invention.

Figure 2:
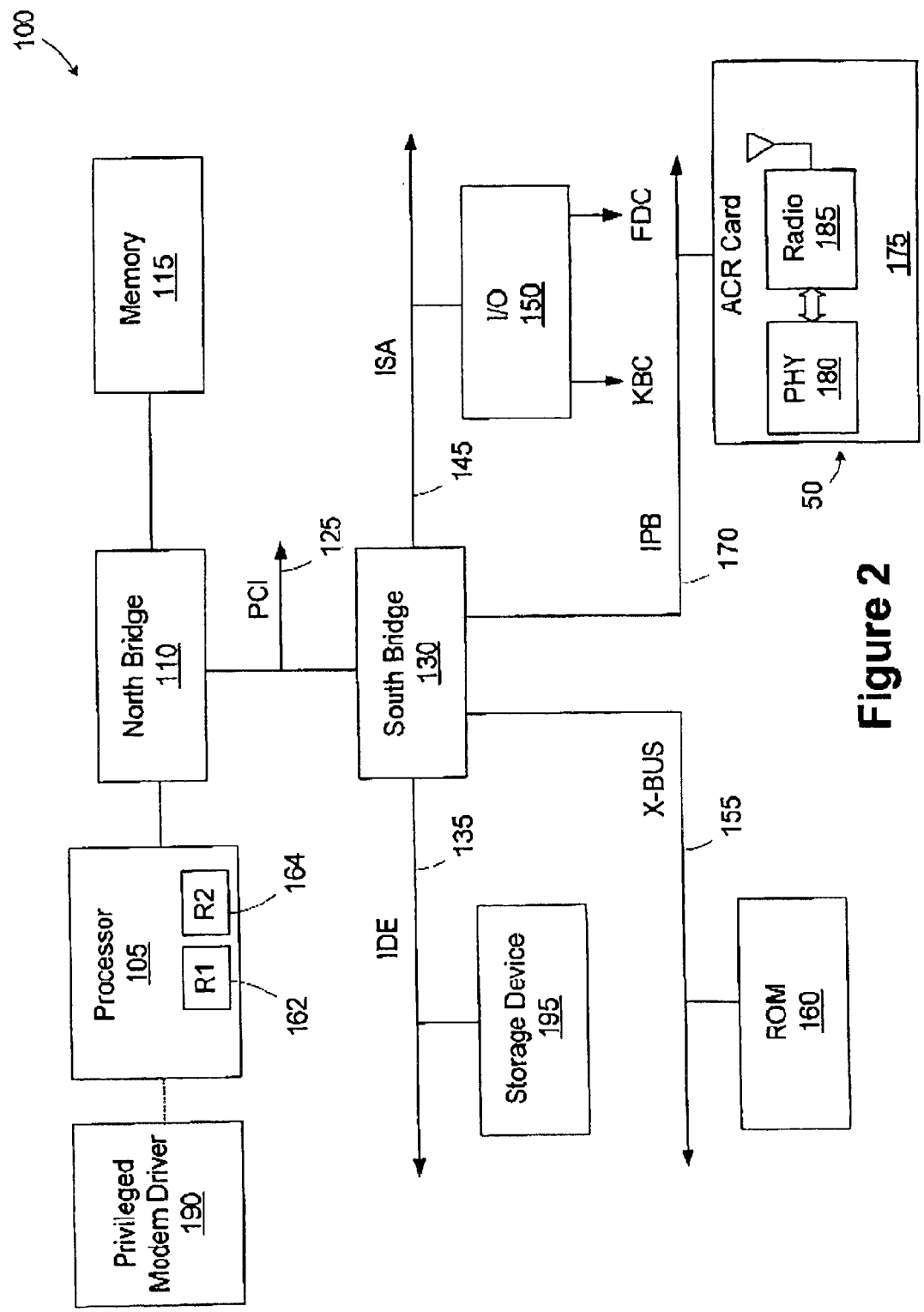
FIG. 2 is a simplified block diagram of an exemplary computer system that embodies the user station in the communications system of FIG. 1.

Turning now to FIG. 2, a block diagram of the user station 20 embodied in a computer system 100 is provided. For clarity and ease of understanding not all of the elements making up the computer system 100 are described in detail. Such details are well known to those of ordinary skill in the art, and may vary based on the particular computer vendor and microprocessor type. The computer system 100 includes a processor 105, a north bridge 110, a memory 115, a Peripheral Component Interconnect (PCI) bus 125, a south bridge 130, an AT Attachment (ATA) interface (more commonly known as an Integrated Drive Electronics (IDE) interface) 135, an Industry Standard Architecture (ISA) bus 145, an input/output controller chip 150, a keyboard and mouse controller (KBC) interface, a floppy disk controller (FDC) interface, an X-bus 155, a read only memory (ROM) 160, and an Integrated Packet Bus (IPB) 170.

The north bridge 110 and the south bridge 130 may be part of a single chip or a plurality of chips. Although not so limited, the processor 105 in the illustrated embodiment is an x86 processor. The architecture of the x86 processor is described in a document entitled "Intel Architecture Software Developer's Manual," Volume 3, which is incorporated herein by reference in its entirety.

The computer system 100 may include other buses, devices, and/or subsystems, depending on the implementation desired. For example, the computer system 100 may include caches, modems, parallel or serial interfaces, SCSI interfaces, network interface cards, and the like.

In the illustrated embodiment, the processor 105 includes first and second registers 162, 164 that define a region of memory where super-privileged code is stored. As is described in more detail below, the super-privileged code, in accordance with the present invention, comprises a set of computer instructions having a high security level that controls access to selected resources of the computer system 100.

The processor 105 is coupled to the north bridge 110. The north bridge 110 provides an interface between the processor 105, the memory 115, and the PCI bus 125. The south bridge 130 provides an interface between the PCI bus 125 and the peripherals, devices, and subsystems coupled to the IDE interface 135, the ISA bus 145, and the X-bus 155. The I/O interface 150 is coupled to the ISA bus 145.

The north bridge 110 provides communications access between and/or among the processor 105, memory 115, devices coupled to the PCI bus 125, and devices and subsystems coupled to the south bridge 130. Typically, removable peripheral devices are inserted into PCI "slots" (not shown) that connect to the PCI bus 125 to couple to the computer system 100. Alternatively, devices located on a motherboard may be directly connected to the PCI bus 125.

The south bridge 130 provides an interface between the PCI bus 125 and various devices and subsystems, especially legacy devices, such as a modem, a printer, keyboard, mouse, etc., which have generally been coupled to the computer system 100 through the X-bus 155, the ISA bus 145, the IDE interface 135, and the IPB bus 170. The south bridge 130 includes the logic necessary to interface the legacy devices to the rest of the computer system 100 through the IDE interface 135, the ISA bus 145, the X-bus 155, and the IPB bus 170.

The IPB bus 170 hosts the hardware portion of the software modem 50. In the illustrated embodiment, the software modem 50 is hosted on an advanced communications riser (ACR) card 175. Specifications for the ACR card 175 and the IPB bus 170 are available from the ACR Special Interest Group (ACRSIG.ORG). The software modem 50 includes a PHY hardware unit 180 and a radio 185. In the illustrated embodiment, the radio 185 is adapted to transmit and receive GSM signals. Collectively, the PHY hardware unit 180 and the radio 185 form the PHY layer 70 (see FIG. 1).

The processor 105 implements the functions of the protocol layer 80 (see FIG. 1) by executing a privileged modem driver 190. As will be described in greater detail below, the processor 105 provides a secure environment for super-privileged code (SPC) to function. The privileged modem driver 190 operates under the SPC context, such that it has a higher degree of security than the standard operating modes of the processors 105. Such a higher degree of security protects the privileged modem driver 190 from tampering.

For incoming data received by the software modem 50, the privileged modem driver 190 demodulates the carrierless waveform to reconstruct encrypted data received by the PHY hardware 180. The process for reconstructing the encrypted data is well known to those of ordinary skill in the art, and is defined in industry GSM standards. For clarity and ease of illustration, the details of the reconstruction process are not included herein.

After reconstructing the encrypted data, the privileged modem driver 190 decrypts the encrypted data using the industry standard decryption techniques defined by the GSM standards to generate decrypted data. The privileged modem driver 190 decodes the decrypted data and extracts control codes and/or user data. The privileged modem driver 190 passes the control codes to the PHY hardware 180. In turn, the PHY hardware 180 configures the radio 185 based on the assigned time slot, frequency, and power level information contained in the control codes.

For data being transmitted by the software modem 50, the privileged modem driver 190 handles all the data processing functions, including encoding, interleaving, burst assembly, encryption, and baseband processing to generate the carrierless transmit waveform. The privileged modem driver 190 passes the transmit waveform to the PHY hardware 180 and radio 185 for upconverting in accordance with the assigned time slot, frequency, and power level previously defined by the control codes.

A storage device 195, such as a hard drive, is coupled to the IDE interface 135. The storage device 195 may have one or more operating systems (OS), device drivers, and other applications stored therein. In an x86 architecture, the operating system and its associated device drivers typically operate at privilege level zero, allowing the OS and the device drivers to access a variety of the resources of the system 100. An example of the operating system that may be installed on the storage device 195 is Windows®, which is currently supported by Microsoft Corporation. The Windows® operating system is generally shipped with a variety of device drivers for controlling the system 100 resources, such as device drivers for the storage device 195, I/O interface 150, and the like. Additionally, third-party device drivers may also be employed by the Windows® operating system.

The ROM 160 may contain a BIOS (basic input/output system) which manages data flow between the operating system running on the computer system 100 and attached devices such as the storage device 195, input/output interface 150, and the like. In one embodiment of the instant invention, the super-privileged code (SPC) may be stored in the ROM 160, so that the SPC initializes at substantially the same time as the BIOS, when the computer system 100 is turned on. Although the super-privileged code is resident in the ROM 160 in the illustrated embodiment, it should be noted that the SPC may reside in other places as well, including in a local memory (not shown) of the processor 105, in the storage device 195, or any other suitable memory location from which the SPC may be executed. In an alternative embodiment, the SPC may be implemented as a portion of the operating system, in which case the SPC will most likely be stored in the storage device 195.

Figure 3:
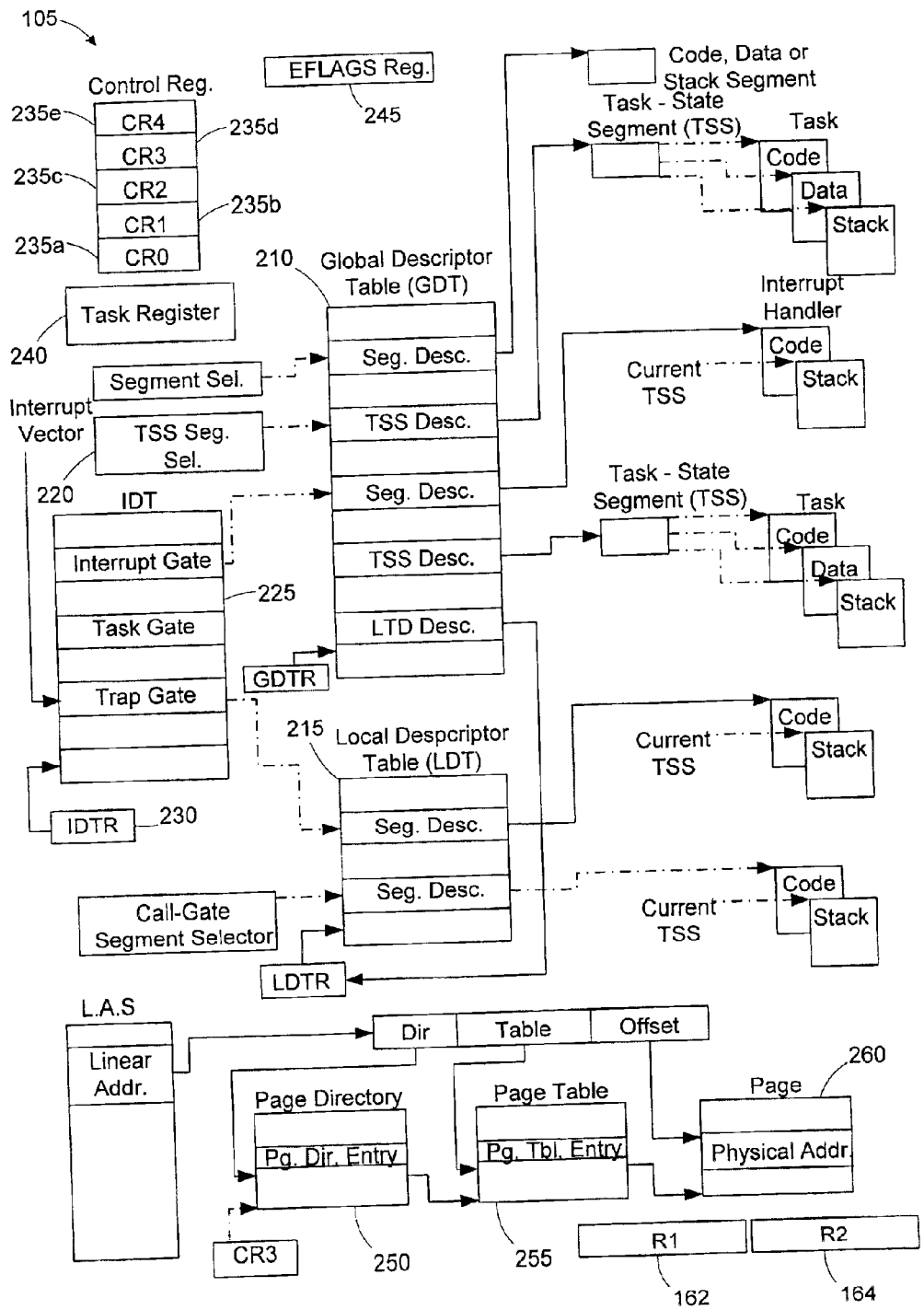
FIG. 3 depicts one embodiment of a processor that may be employed in the computer system of FIG. 2.

Referring now to FIG. 3, a specific embodiment of the processor 105 is illustrated. In particular, the processor 105 is an x86 processor. The x86 architecture of the processor 105 supports a plurality of operating modes, including protected mode, real-address mode, and system management mode. The protected mode is the native operating mode of the processor 105. In the protected mode, all instructions and features of the processor 105 are available. The real-address mode provides a programming environment of the Intel® 8086 processor, and the system management mode provides an operating system with a transparent mechanism for implementing power management and OEM differentiation features.

As shown in FIG. 3, the processor 105 includes a global descriptor table (GDT) 210, a local descriptor table (LDT) 215, a task-state segment (TSS) 220, an interrupt descriptor table (IDT) 225, an IDT register 230, five control registers 235($a$–$e$), and a task register 240. Substantially all memory accesses pass through either the GDT 210 or the (optional) LDT 215 when operating in the protected mode. The GDT and LDT 210, 215 contain entries called segment descriptors. A segment descriptor provides a base address of a segment and access rights, type, and usage information. Each segment descriptor has an associated segment selector that provides an index into the GDT or LDT 210, 215.

The TSS 220 defines the state of the execution environment for a task. The TSS 220 includes a state of the general-purpose registers (not shown), the segment registers, an EFLAGS register 245, segment selectors, and stack pointers for three stack segments (one stack each for privilege levels 0, 1, and 2). The TSS 220 also includes a segment selector for the LDT 215 associated with the task and the page-table base address.

The task register 240 holds a segment selector, a base address, a segment limit, and descriptor attributes for the TSS 220 of the current task. The task register 240 references a TSS descriptor in the GDT 210, where the base address specifies the linear address of the TSS 220, the segment limit specifies the number of bytes in the TSS 220. The LTR and STR instructions load and store the segment selector portion of the task register 240, respectively. When the LTR instruction loads a segment selector in the task register 240, the base address, limit, and descriptor attributes from the TSS descriptor are automatically loaded into the task register 240. When a task switch occurs, the task register 240 is automatically loaded with the segment selector and descriptor for the TSS 220 for the new task. The contents of the task register 240 are not automatically saved prior to writing the new TSS information into the register 240.

The IDT 225 handles external interrupts, software interrupts, and exceptions. The IDT 225 contains a collection of gate descriptors, which provide access to interrupt and exception handlers. The gate descriptors in the IDT 225 can be of the interrupt-gate, trap-gate, or task-gate type. The processor 105 accesses an interrupt or exception handler upon receiving an interrupt vector from internal hardware, an external interrupt controller, or from software. Like the GDT 210, the IDT 225 is not a segment. The linear address of the base of the IDT 225 is contained in the IDT register (IDTR) 230.

The control registers 235($a$–$e$) determine the operating mode of the processor 105 and the characteristics of the currently executing task. The control registers 235($a$–$e$) contain a variety of flags and data fields for controlling system-level operations. Specifically, the CR0 register 235$a$ contains system control flags that control the operating mode and states of the processor 105. The CR1 register 235$b$ is reserved. The CR2 register 235$c$ comprises the page-fault linear address. The CR3 register 235$d$, which is often also referred to as the page-directory base register, includes the physical address of the base of the page directory 250 and two flags. The two flags control caching of the page directory 250 in the internal data caches (not shown) of the processor 105. The CR4 register 235$e$ contains a group of flags that enable several architectural extensions.

The x86 architecture of the processor 105 is capable of supporting direct physical addressing of memory 115 (see FIG. 1) or virtual memory (through paging). When physical addressing is utilized, a linear address is treated as a physical address. When paging is utilized, substantially all of the code, data, stack, and system segments and the GDT and IDT 210, 215 may be paged.

The location of pages in physical memory 115 is contained in up to four types or levels of system data structures. The base physical address of the paging data is contained in control register CR3 235$d$. For paging, a linear address is broken into multiple parts, providing separate offsets into each of the respective paging tables 255 and a page frame 260. In one exemplary embodiment illustrated in FIG. 2, a two-level system data structure is described. An entry in a page directory 250 contains the physical address of a base of a page table 255, access rights, and memory management information. An entry in the page table 255 contains the physical address of a page frame, access rights, and memory management information. The base physical address of the page directory 250 is contained in control register CR3 235$d$. In the exemplary embodiment of FIG. 2, for paging, a linear address is broken into three parts, providing separate offsets into the page directory 250, the page table 255, and the page fame 260.

In accordance with the present invention, the SPC comprises a series of "super privileged" instructions that may be executed by calling programs having access to such instructions. The term "program" is utilized herein as a general term for a logical unit or block of code, such as a procedure, function, routine, and the like. Thus, for example, the "program" may be an operating system or any other application. Limited access to selected SPC instructions provides an added level of security to the computer system 100 that is not otherwise present in current systems. That is, with the advent of the instant invention, programs (e.g., operating systems, associated device drivers) operating at the zero privilege level do not automatically gain access to the system 100 resources. Instead, as described in more detail below, the SPC of the instant invention may selectively grant different privileges to different programs operating at the zero privilege level. For example, only the privileged modem driver 190 is authorized to configure transmission parameters of the PHY hardware 180 and radio 185 (i.e., based on the control codes).

FIG. 4 illustrates a list of exemplary "super privileged" instructions 330 and the associated access rights 325 granted to programs having the authority to invoke these instructions. For example, entry 350 depicts only the operating system as having the authority to access the CR3 register 235$d$. Thus, if the operating system attempts to access the CR3 register 235$d$, the SPC will allow the access to be completed, while requests to access the CR3 register 235$d$ by programs other than the OS will be denied. The mechanism by which the SPC allows selected programs to execute the super privileged instructions 330 is described in more detail with respect to FIG. 5 below.

It should be noted that the access rights depicted in FIG. 4 are for illustrative purposes only. Those skilled in the art will appreciate that the access rights 325, and the selected privileged instructions 330, may be implementation-specific, and may thus vary from one implementation to another. Entry 360 illustrates the OS and its associated device drivers having access to the GDT 210, while entry 365 illustrates that any application operating at the zero privilege level has access to the IDTR 230. Entry 370 depicts the OS and the device drivers having access to the task register 240. Entry 380 depicts the privileged modem driver 190 having exclusive access to the PHY hardware 180.

Figure 5:
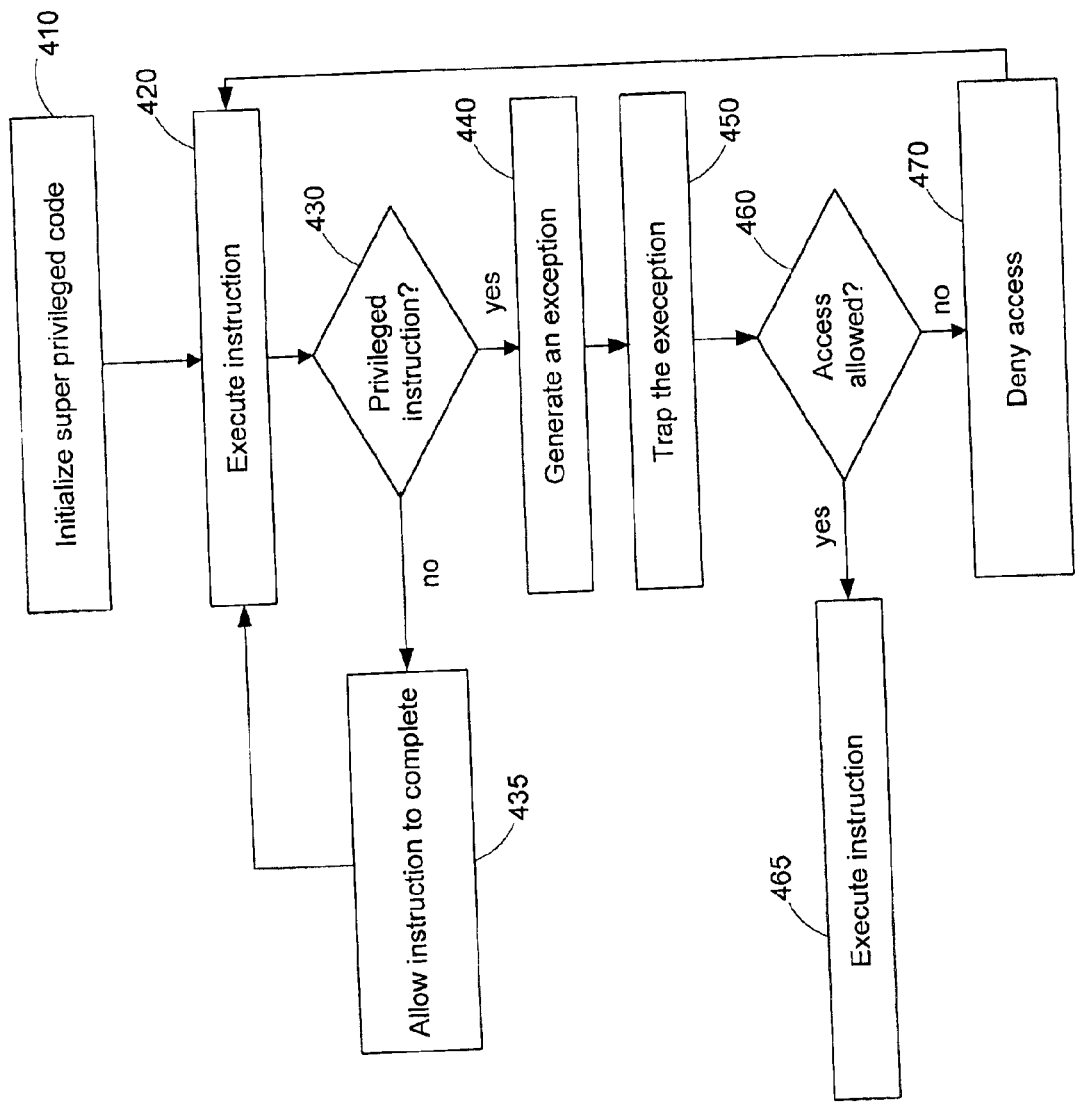
FIG. 5 illustrates a method for identifying privileged instructions in accordance with the present invention that may be employed by the computer system of FIG. 1.

FIG. 5 illustrates a method that may be employed by the computer system 100 of FIG. 1. The method of FIG. 5 begins at block 410, where the SPC initializes when the computer system 100 is turned on. During initialization, the SPC writes to the first and second registers 162, 164 of the processor 105 to define a protected memory region that houses the SPC. It should be noted that in an alternative embodiment, instead of two registers 162, 164, it is possible to define the protected memory region using one register. That is, a single register may be utilized to identify the starting address of the memory region, while a preselected offset value may be utilized to define the ending address of the memory region that houses the SPC.

The two registers 162, 164, once written, define the protected memory region where the SPC resides. The protected memory region may be defined in the memory 115, in the ROM 160, or any other storage area from which SPC may be executed. If the registers are programmed to point to a memory region in the memory 115, the SPC then copies itself to the protected memory region defined by the two registers 162, 164, thus shielding the SPC from all other programs. In an alternative embodiment, the SPC may program the two registers 162, 164 to simply point to the ROM 160, the location where the SPC initially resides. In this case, the SPC may thereafter execute directly from the ROM 160, although for faster performance it may be desirable to execute the SPC from the memory 115.

At block 420, when a program (e.g., the privileged modem driver 190) attempts to execute an instruction, the processor 105, at block 430, determines if the instruction is one of the selected privileged instructions 330 (see FIG. 4) that is part of the SPC. If the instruction is not one of the privileged instructions 330, then, at block 435, the processor 105 allows the instruction to complete. If, however, the instruction being executed by the program is one of the privileged instructions 330, then, at block 440, the processor 105 generates an exception. At block 450, the SPC traps the exception that is generated by the processor 105. For example the instruction may be directed at changing the configuration of the PHY hardware 180.

At block 460, the SPC determines if the program attempting to execute the privileged instruction has proper access rights. Access rights to the calling programs may be granted on a program-by-program basis, as shown in FIG. 3, for example. To identify the calling program, the SPC, in one embodiment, references the stack based on the address of the calling program. Alternatively, publicly available debuggers, such as Soft-Ice, may be employed to authenticate the location of the calling program. If the call originates from a program authorized to execute the privileged instruction, the SPC, at block 465, executes the privileged instruction. For example, if a configuration command directed at the PHY hardware 180 is detected, the SPC may verify that it originated from the privileged modem driver 190.

The SPC is able to authenticate the calling program based on the program's signatures, installed perhaps during installation of the calling program. For example, assuming that the calling program is the operating system, the signatures of the operating system, generated presumably during installation, may later be utilized to authenticate calls made by the operating system.

If, at the block 460, the SPC determines the calling program does not have access to the privileged instruction, then, at block 470, the request is denied. Access to privileged instructions may be denied for several reasons. First, if the calling program does not have access rights to the privileged instructions, then the calling program's request to execute the privileged instruction may be denied. If a covert program attempts to write new control codes to the PHY hardwarer 180, the request may be denied. Second, access to privileged instructions may be denied if the SPC cannot verify the authenticity of the calling program. That is, even though the calling program may have access rights to invoke the privileged instruction, its request may nevertheless be denied if the SPC cannot verify, using the stack, that it is in fact the authorized calling program (as opposed to malicious code masquerading as the calling program, such as the privileged modem driver 190) that is attempting to execute the privileged instruction.

To better illustrate the method of FIG. 4, an example is herein provided. Assume for illustrative purposes that, at the block 420, the privileged modem driver 190 attempts to modify the configuration of the PHY hardware 180. Furthermore, for the purposes of this illustration, assume that the SPC comprises the privileged instructions 330 of FIG. 3, and assume that the programs listed in FIG. 3 have the access rights 325 to the privileged instructions 330. At the block 430, the processor 105 determines if accessing the PHY hardware 180 is a privileged instruction, and since, according to FIG. 3, it is, the processor 105 generates an exception at the block 440. At the block 450, the SPC traps the exception that was generated, at the block 440, by the processor 105.

The SPC then, at the block 460, determines if the privileged modem driver 190 (i.e., the calling program) has access rights to modify the configuration of the PHY hardware 180. Before allowing the PHY hardware 180 configuration to be modified, the SPC first attempts to verify that the initial request to modify the PHY hardware 180 was in fact by the privileged modem driver 190. One method of authenticating the operating system's request is to reference the stack. If the address from the stack confirms that it is in fact the privileged modem driver 190 that issued the request to modify the configuration of the PHY hardware 180, then, at the block 465, the SPC executes the instruction to modify the configuration of the PHY hardware 180. When the SPC executes the instruction to modify the configuration of the PHY hardware 180, the processor 105 will complete the request without generating an exception because the request is being provided by the SPC, which is authorized to modify the configuration of the PHY hardware 180.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A communications system, comprising:

physical layer hardware adapted to communicate data over a communications channel in accordance with a plurality of control codes, the physical layer hardware being adapted to demodulate an incoming analog signal to generate a digital receive signal and modulate a digital transmit signal to generate an analog transmit signal;

a processing unit adapted to execute a privileged driver for interfacing with the physical layer hardware, the privileged driver including program instructions for implementing a protocol layer to decode the digital receive signal, encode the digital transmit signal, and configure the physical layer hardware for receipt of the digital receive signal and transmission of the digital transmit signal based on the plurality of control codes; and a memory adapted to store a privileged code, the privileged code when executed by the processing unit being adapted to determine if a calling program has authority to execute a privileged instruction for configuring the physical layer hardware, and the processing unit being adapted to execute the privileged instruction in response to determining the calling program has the authority to execute the privileged instruction.

2. The system of claim 1, wherein the privileged code when executed by the processing unit adapted to define an instruction for configuring the physical layer hardware as the privileged instruction and receiving a request to execute the privileged instruction from the calling program.

3. The system of claim 2, wherein the privileged code, when executed, is adapted to determine if the calling program comprises the privileged driver.

4. The system of claim 2, further comprising a first and second register, wherein the privileged code, when executed, is adapted to write to the first and second registers to define a memory region in a computer system where the privileged instruction resides.

5. The system of claim 2, wherein the privileged code, when executed, is adapted to determine if the calling program has authority to execute the privileged instruction by referencing a stack of a computer system to verify the identity of the calling program.

6. The system of claim 2, wherein the privileged code, when executed, is adapted to determine if the calling program has authority to execute the privileged instruction by authenticating the calling program.

7. The system of claim 2, wherein the privileged code, when executed, is adapted to receiving the request to execute the privileged instruction by receiving an exception generated by the processing unit in response to the calling program attempting to execute the privileged instruction.

8. The system of claim 1, wherein the control codes include at least one of a power level assignment, a frequency assignment, and a time slot assignment.

9. The system of claim 1, wherein the processing unit comprises a microprocessor.

10. The system of claim 1, further comprising:

a processor complex adapted to execute the privileged code;

a bus coupled to the processor complex; and an expansion card coupled to the bus, the expansion card including the physical layer hardware.

11. A communications system, comprising:

physical layer hardware adapted to communicate data over a communications channel in accordance with a plurality of control codes, the physical layer hardware being adapted to demodulate an incoming analog signal to generate a digital receive signal and modulate a digital transmit signal to generate an analog transmit signal;

a processing unit adapted to execute a privileged driver for interfacing with the physical layer hardware, the privileged driver including program instructions for implementing a protocol layer to decode the digital receive signal, encode the digital transmit signal, and configure the physical layer hardware for receipt of the digital receive signal and transmission of the digital transmit signal based on the plurality of control codes;

a memory adapted to store a privileged code, the privileged code, when executed by the processing unit, being adapted to define an instruction for configuring the physical layer hardware as a privileged instruction, receiving a request to execute the privileged instruction from a calling program, determine if the calling program has authority to execute the privileged instruction, and execute the privileged instruction in response to determining the calling program has the authority to execute the privileged instruction.

12. A method for configuring a transceiver, comprising:

demodulating an incoming analog signal to generate a digital receive signal based on a plurality of control codes;

modulating a digital transmit signal to generate an analog transmit signal based on the control codes;

executing a privileged driver for configuring the plurality of control codes;

determining if a calling program has authority to execute a privileged instruction for configuring the plurality of control codes; and executing the privileged instruction in response to determining the calling program has the authority to execute the privileged instruction.

13. The method of claim 12, further comprising:

defining an instruction for configuring the control codes as a privileged instruction; and receiving a request to execute the privileged instruction from a calling program.

14. The method of claim 13, wherein determining if the calling program has authority to execute the privileged instruction further comprises determining if the calling program comprises the privileged driver.

15. The method of claim 13, wherein determining if the calling program has authority to execute the privileged instruction further comprises referencing a stack of a computer system to verify the identity of the calling program.

16. The method of claim 13, wherein determining if the calling program has authority to execute the privileged instruction further comprises authenticating the calling program.

17. The method of claim 13, wherein receiving the request to execute the privileged instruction further comprises receiving an exception in response to the calling program attempting to execute the privileged instruction.

18. The method of claim 12, wherein demodulating the incoming analog signal based on the plurality of control codes further comprises demodulating the incoming analog signal based on at least one of a frequency assignment, and a time slot assignment.

19. The method of claim 12, wherein modulating the digital transmit signal based on the control codes further comprises modulating the digital transmit signal based on at 20. A method for configuring a transceiver, comprising:

demodulating an incoming analog signal to generate a digital receive signal based on a plurality of control codes;

modulating a digital transmit signal to generate an analog transmit signal based on the control codes;

executing a privileged driver for configuring the plurality of control codes;

defining an instruction for configuring the control codes as a privileged instruction;

receiving a request to execute the privileged instruction from a calling program;

determining if the calling program has authority to execute the privileged instruction; and executing the privileged instruction in response to determining the calling program has the authority to execute the privileged instruction.

21. A communication systems comprising:

means for demodulating an incoming analog signal to generate a digital receive signal based on a plurality of control codes;

means for modulating a digital transmit signal to generate an analog transmit signal based on the control codes;

means for executing a privileged driver for configuring the plurality of control codes;

means for determining if a calling program has authority to execute a privileged instruction for configuring the plurality of control codes; and means for executing the privileged instruction in response to determining the calling program has the authority to execute the privileged instruction.

22. The system of claim 21, further comprising:

means for defining an instruction for configuring the control codes as a privileged instruction; and means for receiving a request to execute the privileged instruction from a calling program.

* * * * *